US005307354A

United States Patent [19]

Cramer et al.

[11] Patent Number: 5,307,354

[45] Date of Patent: Apr. 26, 1994

[54] METHOD AND APPARATUS FOR REMOTE MAINTENANCE AND ERROR RECOVERY IN DISTRIBUTED DATA PROCESSING NETWORKS

[75] Inventors: Keith D. Cramer, Rochester; Frederick H. Keller, Byron, both of Minn.

[73] Assignee: International Business Machines Corporation, Armonk, N.Y.

[21] Appl. No.: 708,149

[22] Filed: May 31, 1991

[51] Int. Cl.⁵ .............................. G06F 11/00
[52] U.S. Cl. .......................... 371/11.2; 371/7; 371/12; 371/20.6
[58] Field of Search ............... 371/11.1, 11.2, 11.3, 371/12, 20.6, 7, 15.1; 364/280.3, 280.2; 370/13, 16.1

[56] References Cited

U.S. PATENT DOCUMENTS

| Re. 30,037 | 6/1979 | Bass | 371/15.1 X |
|---|---|---|---|
| 4,503,535 | 3/1985 | Budde | 371/11.3 |
| 4,589,090 | 5/1986 | Downing | 371/7 |
| 4,870,638 | 9/1989 | Kawano | 371/7 X |
| 4,949,248 | 8/1990 | Caro | 364/200 |
| 4,951,069 | 8/1990 | Rabjohns et l. | 346/154 |
| 4,972,453 | 11/1990 | Daniel | 371/15.1 X |
| 5,016,243 | 5/1991 | Fite | 371/8.2 X |
| 5,023,873 | 6/1991 | Stevenson | 371/20.6 X |
| 5,146,568 | 9/1992 | Flaherty | 395/325 |

OTHER PUBLICATIONS

Casale et al., Reliability and Fault Tolerance Aspects in an Industrial Lan, Jul. 1988, pp. 339-345.
Reference IBM PC Local Area Network Program, Version 1.30.

Primary Examiner—Robert W. Beausoliel, Jr.
Assistant Examiner—Glenn Snyder
Attorney, Agent, or Firm—Andrew J. Dillon

[57] ABSTRACT

A method and apparatus for remote maintenance and error recovery for plural stations interconnected in a distributed network. A monitor application is established within selected stations within the network in a terminate and stay resident mode. The monitor application is then automatically invoked in response to error message, reconfiguration messages, or network status messages received at that station by listing the monitor application address within user appendages associated with such error messages or reconfiguration messages within the network interface of the station. An error message may be displayed and any selected application or procedure may then be invoked by the monitor application in an application independent manner. In one embodiment of the present invention, a station may be reset remotely in response to an error message or reconfiguration message by utilizing the monitor application and the station may then be directed to establish communication with a server device in order to update system software. This may be simply accomplished within a computer station utilizing a DOS operating system by merely altering the automatic execution batch file.

9 Claims, 4 Drawing Sheets

METHOD AND APPARATUS FOR REMOTE MAINTENANCE AND ERROR RECOVERY IN DISTRIBUTED DATA PROCESSING NETWORKS

BACKGROUND OF THE INVENTION

1. Technical Field

The present invention relates in general to the field of distributed computer networks and in particular to a method and apparatus for remote maintenance and error recovery within distributed data processing networks. Still more particularly, the present invention relates to a method and apparatus which permits network stations to automatically invoke a selected application or procedure in response to an error message or reconfiguration message from the network.

2. Description of the Related Art

Distributed data processing networks are well known in the art. In fact, in selected applications, networks of terminals or so-called "personal" computers are rapidly supplanting large concentrated data processing systems due to the ease of updating, modifying and relocating such systems. Examples of various types of networks in use today include: bus topologies; ring topologies; star topologies; and, tree topologies. Each topology utilizes a distinctive manner to interconnect all stations within the network.

Additionally, many different protocols exist for formatting data which is exchanged between stations within a network. For example, token ring networks allow unidirectional data transmission between data stations by a token passing procedure over one transmission medium so that transmitted data returns to the transmitting station. IEEE Standard 802.5 was approved for token ring networks in December of 1984.

Many other network protocols exist including: Advanced Peer-to-Peer Networks (APPN); Ethernet Networks (as set forth in IEEE Standard 802.3); Token Bus Network (IEEE Standard 802.4); and others. Many of these networks are so-called "self-healing" networks in that the network system possess the ability to reconfigure the network in response to an error condition. For example, within token ring networks, one station, referred to as the "active monitor" provides token monitoring and other functions. The active monitor station resolves lost tokens, frames which circle the ring more than once, clocking, and the presence of other active monitors on the ring. A timer within the active monitor station is typically utilized to detect a lost token by timing the period of time required for the largest possible frame of data to circle the ring. If this time is exceeded, the active monitor assumes the token was lost, purges the ring and initiates a new token.

Certain errors within such networks are often referred to as "hard" errors. Hard errors are permanent faults, usually in equipment, which cause a ring to cease operation within normal architecture protocols. A ring station which is downstream from a hard error will recognize such an error at its receiver input and begin transmitting beacon frames, paced at predetermined intervals, with an all station address. This continues until the fault is restored. Fault restoration generally occurs by having each station perform a test in response to an error signal and then reattach itself to the ring only if the test is successful.

Thus, an error signal may be utilized to automatically reconfigure a ring network by removing a station which has caused the fault condition. Additionally, a station may be removed by utilizing an explicit command, such as "Auto Removal" which is utilized in an IBM Token-Ring Network to remove a device, such as an attached personal computer, from the data passing activity without human intervention by means of a token-ring adapter card. This technique, as well as other low level commands, is accomplished utilizing the so-called "Logical Link Control" (LLC) standard which is defined by IEEE Standard 802.2.

While these methods described above permit such networks to practice "self-healing" the end result may not be acceptable. For example, certain errors may result in the reconfiguration of a network which deletes a "bridge" or "gateway" station which may be necessary for connectivity within the larger network. In such situations a bridge or gateway station must then be manually reset to reestablish communication between the two rings or a ring in a host system. Additionally, certain network management facilities may suspend a station, requiring that station to undergo a manual Initial Program Load (IPL) to return the station to full communication.

Thus, it should be apparent that a need exists for a method and system which will permit remote maintenance and error recovery in distributed data processing networks.

SUMMARY OF THE INVENTION

It is therefore one object of the present invention to provide an improved distributed data processing network.

It is another object of the present invention to provide an improved method and apparatus for remote maintenance and error recovery within distributed data processing networks.

It is yet another object of the present invention to provide an improved method and apparatus which permits network stations to automatically invoke a selected application or procedure in response to an error message or reconfiguration message from the network.

The foregoing objects are achieved as is now described. The method and apparatus of the present invention may be utilized for remote maintenance and error recovery for plural stations interconnected in a distributed network. A monitor application is established within selected stations within the network in a terminate and stay resident mode. The monitor application is then automatically invoked in response to error messages, reconfiguration messages, or network status messages received at that station by listing the monitor application address within user appendages associated with such error messages or reconfiguration messages within the network interface of the station. An error message may be displayed and any selected application or procedure may then be invoked by the monitor application in an application independent manner. In one embodiment of the present invention, a station may be reset remotely in response to an error message or reconfiguration message by utilizing the monitor application and the station may then be directed to establish communication with a server device in order to update system software. This may be simply accomplished within a computer station utilizing a DOS operating system by merely altering the automatic execution batch file.

BRIEF DESCRIPTION OF THE DRAWING

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF PREFERRED EMBODIMENT

Figure 1:
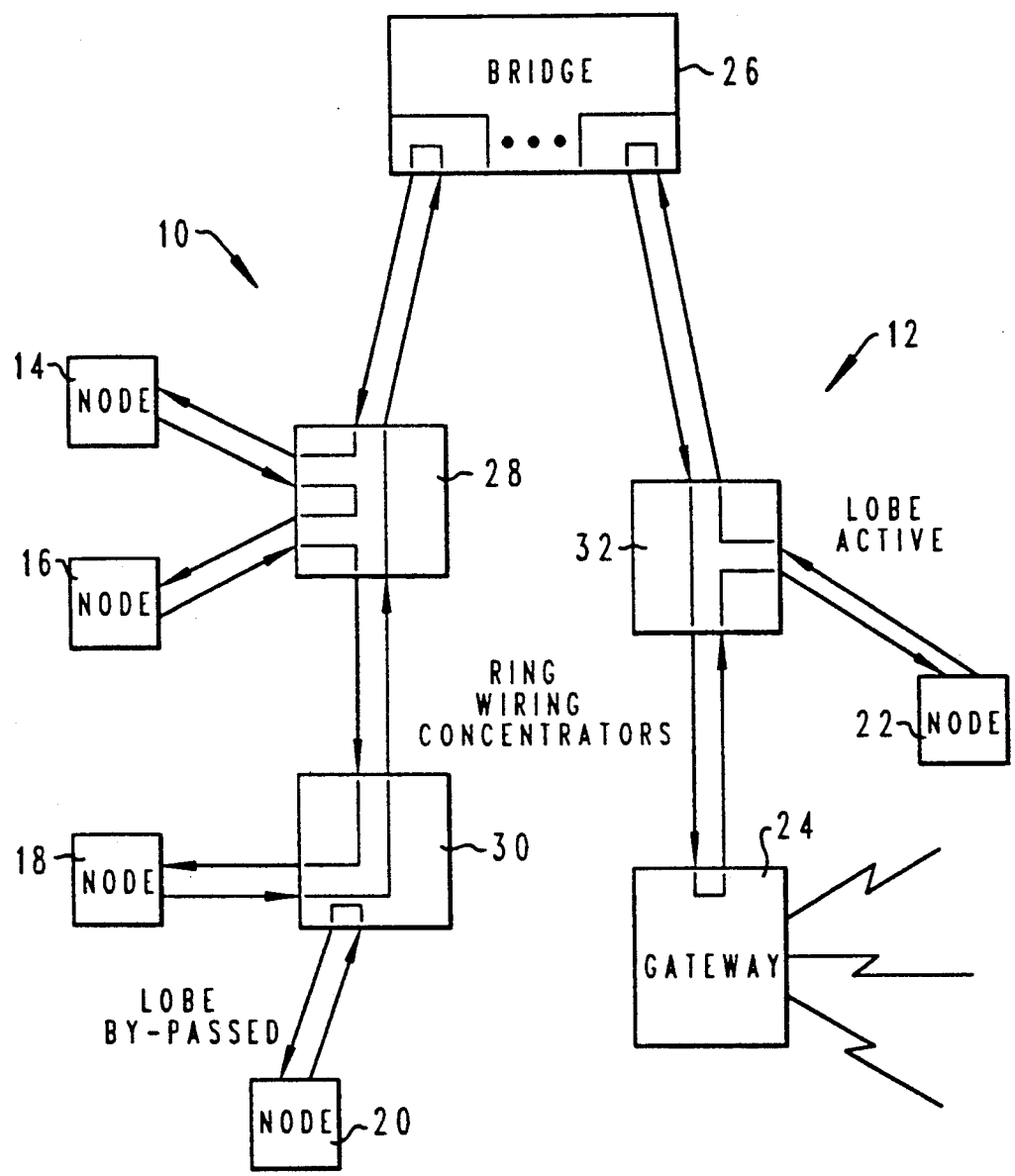
FIG. 1 depicts a pictorial representation of two data processing networks interconnected by a bridge station which may be utilized to implement the method and system of the present invention.

With reference now to the figures and in particular with reference to FIG. 1, there is depicted a pictorial representation of two data processing networks 10 and 12 which are interconnected by a bridge station 26, which may be utilized to implement the method and system of the present invention. The data processing networks 10 and 12 depicted within FIG. 1 are exemplary of a token ring network; however, those skilled in the art will appreciate that the method and system of the present invention may be utilized with any network wherein the network system may reconfigure the network in response to error conditions and/or explicit commands deleting stations from within the network.

As illustrated, data processing network 10 includes a plurality of nodes or stations 14, 16, 18 and 20. Nodes 14, 16, 18 and 20, while logically described as a ring in token ring network systems, are physically wired much in the same manner as a star network. That is, each node is wired directly to a ring wiring concentrator, such as ring wiring concentrators 28 and 30. In this manner, in the event an error is detected within one node which might otherwise cause a fault throughout the entire token ring network, that node may be automatically bypassed in an example of the "self-healing" technique described above. Thus, station or node 20 is depicted as having been bypassed, and no longer forms an active part of data processing network 10.

Similarly, a second data processing network 12 is provided including node or station 22 and gateway server 24, which are both connected to ring wiring concentrator 32. Bridge station 26 is connected to both ring wiring concentrator 28 and ring wiring concentrator 32 and thus serves as a bridge between data processing network 10 and data processing network 12. Those skilled in the art will appreciate that despite the capability of "self-healing" an error condition which results in the reconfiguration of either data processing network 10 or data processing network 12 such that bridge station 26 has been deleted will adversely affect the connectivity between those two networks. Thus, it should be apparent that a need exists for a method and system whereby the various stations within data processing network 10 and data processing network 12 may be remotely maintained and/or remotely reset in order to recover from various error conditions.

As noted above, those skilled in the art will appreciate that the method and system of the present invention may be utilized with any network having the capability of reconfiguring the network via error messages or reconfiguration messages and, each node within such a data processing network may be implemented utilizing any suitable terminal or computer, such as the so-called "personal" computer. Additionally, gateway node 24 may be implemented utilizing a large mainframe computer or other suitable device.

Figure 2:
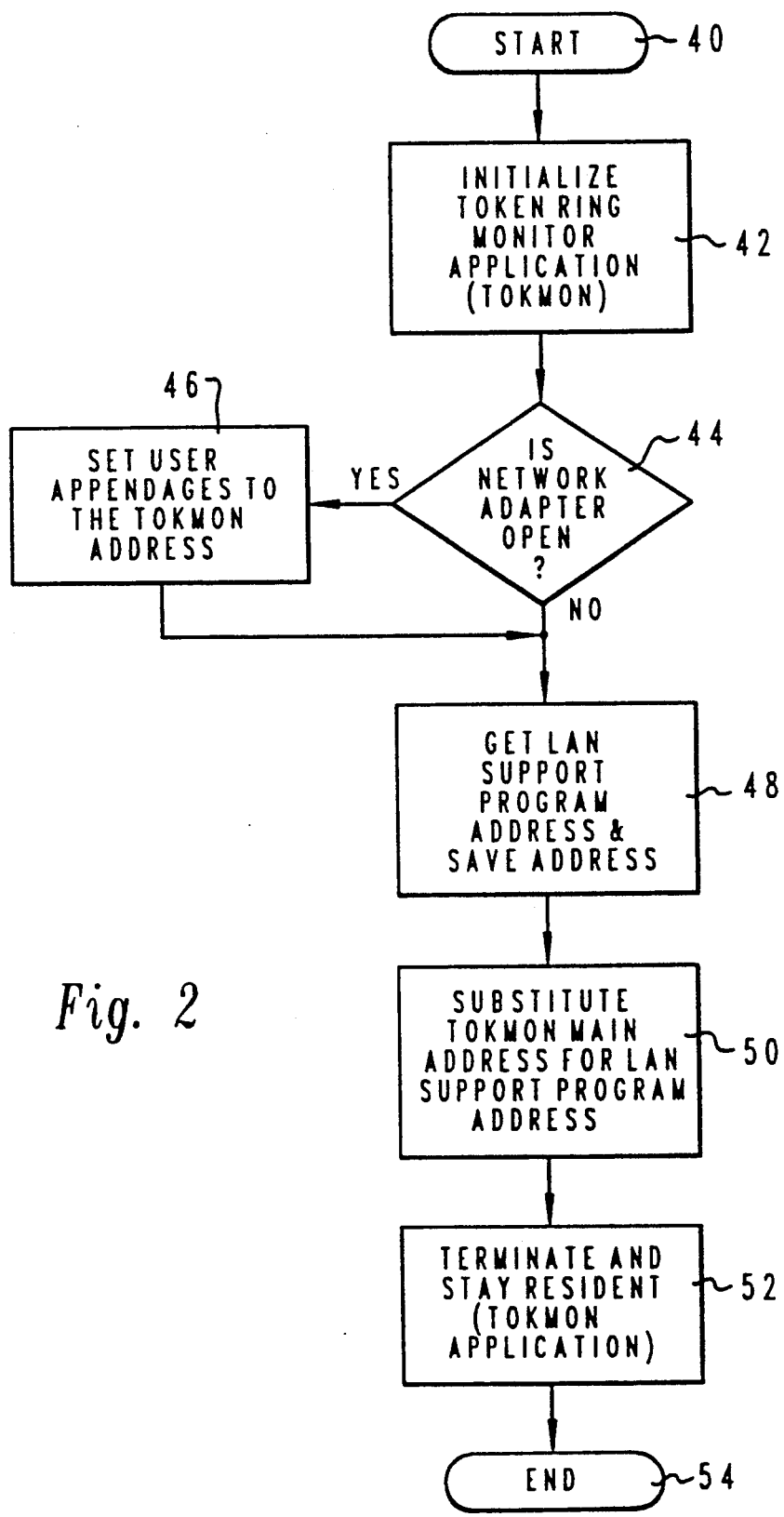
FIG. 2 is a logic flowchart illustrating the initial establishment of a monitor application within a network station in accordance with the method and system of the present invention.

Referring now to FIG. 2, there is depicted a logic flowchart illustrating the initial establishment of a monitor application within a network station in accordance with the method and system of the present invention. As illustrated, the process begins at block 40 and thereafter passes to block 42 which depicts the initialization of a token ring monitor application, hereinafter referred to as TOKMON. Again, while the depicted embodiment of the present invention utilizes a token ring network including stations which operate utilizing the DOS operating system, those skilled in the art will appreciate that the method and system of the present application will have broader impact than the illustrated use.

Next, the process passes to block 44 which illustrates a determination of whether or not the network adapter is open. By "network adapter" what is meant is the network interface device which is utilized to couple a node, such as node 14 (see FIG. 1) into a network. Those skilled in the art will appreciate that such adapters typically include a central processing unit and a limited amount of memory and are capable of independent processing separate and apart from the processor within the node.

In the event the network adapter is open, that is communication between the station or node and the network has been initiated, the process passes to block 46. Block 46 illustrates the setting of the user specifiable addresses associated with the user appendages to the token ring monitor application address. The user appendages provided by a typical network adapter are procedures within a program utilized to deal with specific events and, in the depicted embodiment of the present invention, three selected user appendages within a token ring network system are utilized. Specifically, the Adapter Check, the Network State Change, and the PC ERROR user appendages are modified such that upon the occurrence of one of those events the token ring monitor application will be invoked.

Referring again to block 44, in the event the network adapter is not open, or after having set the user specifiable addresses associated with the user appendages to the address for the token ring monitor application, the process passes to block 48. Block 48 illustrates the getting of the Local Area Network (LAN) Support Program address and the saving of that address. This address will be the address utilized to invoke the Local Area Network (LAN) Support Program and any suitable Local Area Network (LAN) Support Program may be utilized. Next, the process passes to block 50 which depicts the substituting of the token ring monitor MAIN address for the Local Area Network (LAN) support program address.

Next, the token ring monitor application is terminated and stays resident within the selected station of the data processing network in a procedure well known to those skilled in the art and typically referred to as "Terminate and Stay Resident" (TSR) in DOS operating system computers. Thereafter, the procedure passes to block 54 and terminates.

Thus, after initiating the token ring monitor application the monitor application is terminated and stays resident in a manner which is highly unobtrusive to applications running within the selected station. Further, the monitor application may use Basic Input Output System (BIOS) routines to display error information on the computer display and utilizes only a small amount of resident storage memory.

The process depicted within the flowchart of FIG. 2 is thus utilized to initiate the token ring monitor application. Variations in the type and amount of hardware utilized for a particular network and the languages and software packages utilized will necessarily cause variations in the specific manner in which this process is implemented. However, listed below is a pseudo code listing for the application depicted within FIG. 2.

---

PSEUDO CODE

```
INIT
  CONST
    lanlocation = 05CH (* Interrupt vector for PCLAN
                          device driver *)
  VAR rc : RETURN CODE
      savelanaddr : ADDRESS
  BEGIN
      rc := DIR.STATUS.COMMAND ( );
      IF rc = ADAPTER_OPEN
         DIR.SET.USER.APPENDAGES (TOKMON ADDRESS)
      ENDIF
  (*1st get address of LAN Support Program)
  savelanaddr := GetVector (lanlocation) (* PC memory
                          address is returned *)
  (* Now set tokmon MAIN as the address for LAN Support
  Program *)
  SetVector (lanlocation, ADDRESS(MAIN))
  (* Now Terminate TOKMON execution but program remains
  resident *)
  TSR( )
  END INIT.
```

Figure 3:
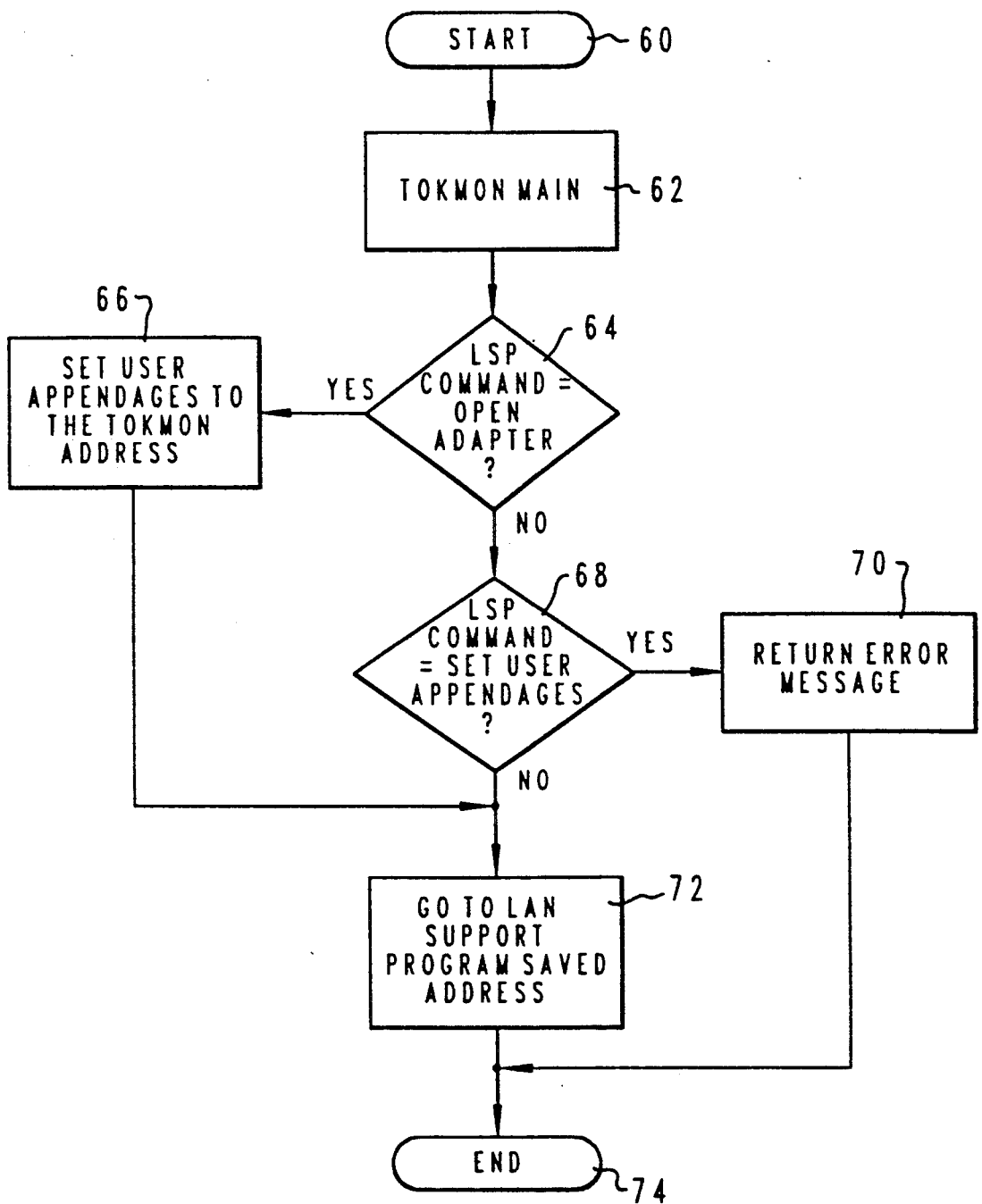
FIG. 3 is a logic flowchart illustrating the manner in which the monitor application address is established within the user appendages provided by a network adapter.

With reference now to FIG. 3, there is depicted a logic flowchart illustrating the manner in which the monitor application address is established within the user appendages provided by a network adapter. As above, the process begins at block 60 and thereafter passes to block 62. Block 62 depicts the invocation of the MAIN address within the token ring monitor application. As described above, this address was substituted for the Local Area Network (LAN) Support Program address, which must necessarily be invoked by any user attempting to establish communication via the network. This process is implemented to ensure that upon the opening of the network adapter the token ring monitor application address is associated with the selected user appendages provided for error and reconfiguration messages. Additionally, in the event a user may attempt to explicitly change the address associated with these user appendages after the monitor application has been selected, this program will ensure that this does not occur.

The process then passes to block 64, which illustrates a determination of whether or not the Local Area Network (LAN) Support Program command which has been entered is a command to open the network adapter. If so, the process passes to block 66. Block 66 again illustrates the setting of the user specifiable addresses associated with the user appendages to the address for the token ring monitor application.

Referring again to block 64, in the event the Local Area Network (LAN) Support Program network command which has been selected is not a command to open the network adapter, the process passes to block 68. Block 68 depicts a determination of whether or not the command which has been selected is a command to set the user specifiable addresses associated with the user appendages. If so, the process passes to block 70, which illustrates the returning of an error message to the user, indicating that the addresses associated with the user appendages have been set and may not be modified.

Referring again to block 68, in the event the command selected is not a command to modify the addresses associated with the user appendages, the process passes to block 72. Block 72 illustrates the invocation of the Local Area Network (LAN) Support Program by calling the address which was saved within block 48 of FIG. 2. Thereafter, the process passes to block 74 and terminates.

As above, variations in the type and quantity of hardware which may be utilized to implement this system and variations in the software systems which may be utilized make it difficult to predict the specific embodiment which may be utilized. Therefore, a pseudo code implementation for the process described in FIG. 3 is listed below. Those skilled in the art will appreciate that this listing may be utilized to vary the process to adapt it to any suitable data processing network.

---

PSEUDO CODE

```
MAIN
(* All commands to adapter will be intercepted by
resident TOKMON *)
VAR
   Command : CommandBlock
BEGIN
   (* All LAN Adapter commands are in a memory block
   addressable by MAIN*)
   Initialize (Command) (* Sets up Command so we can
   read it *)
   IF Command = DIR.OpenAdapter
        (* Steal Error Event Appendages for Adapter
   Error Events *)
        Command.ErrorEventLocation := ADDRESS
(MONITOR)
   ENDIF
   (* Now call the real PC LAN Adapter Device
Driver*)
   IF Command = DIR.Set.User.Appendages
        Command.returncode: = Command Fail
        GO TO END MAIN
   ENDIF
   call SAVELANADDR
END MAIN.
```

Figure 4:
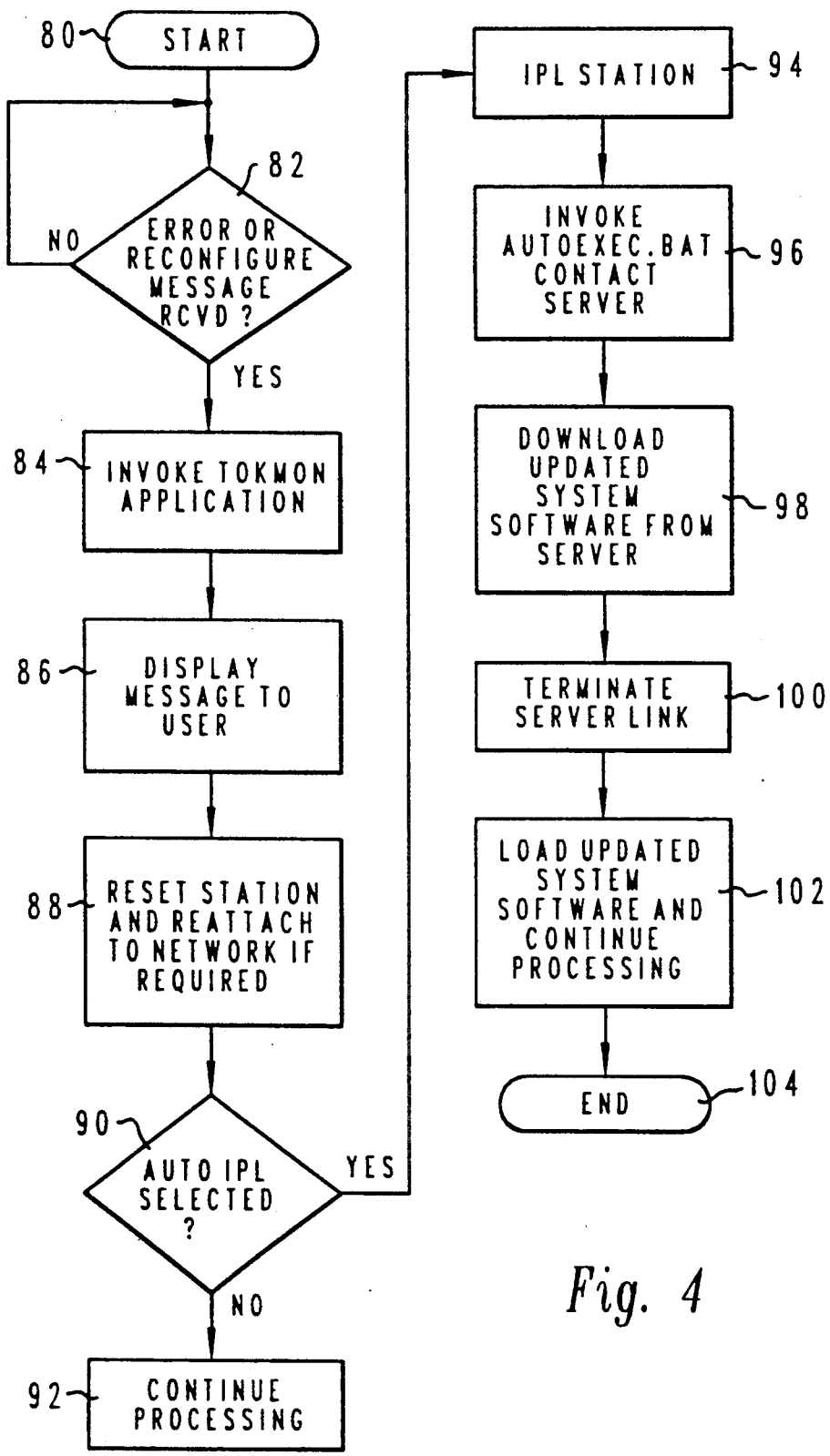
FIG. 4 is a logic flowchart illustrating the remote maintenance and error correction method and system of the present invention utilizing the monitor application described above.

Finally, referring to FIG. 4, there is depicted a logic flowchart illustrating the remote maintenance and error correction method and system of the present invention utilizing the monitor application described above.

This process begins at block 80 and thereafter passes to block 82 which depicts a determination of whether or not an error or reconfigure message has been received at the station in question. If not, the process merely iterates until such time as an error or reconfiguration message is received. After receiving an error message or a reconfiguration message the process passes to block 84. Block 84 illustrates the invocation of the token ring monitor application automatically in response to the error message or reconfiguration message by returning to the addresses previously associated with the user appendages for error messages or reconfiguration messages.

Next, the process passes to block 86. Block 86 depicts the displaying of a message to the user setting forth the error condition or situation which precipitated the reconfiguration message. Of course, those skilled in the art will appreciate that this may be accomplished utilizing the Basic Input Output System (BIOS) routines and that this capability of the token ring monitor application may be deleted in the event error messages are not desired.

Next, the process passes to block 88 which illustrates the resetting of the station and the reattaching of the station to the network if required. Resetting of the station may be accomplished by causing the station to "reboot" in a manner well known to those skilled in the art. Of course, it should be apparent that reattaching the station to the network will not be necessary in the event the error was not of sufficient severity to have caused a removal of the station from the network. Additionally, it may not be possible to reattach the station to the network if a catastrophic hardware failure has occurred.

Next, the process passes to block 90. Block 90 illustrates an important feature of the present invention in that a station may be directed to automatically update system software by executing an Initial Program Load (IPL) in response to an invocation of the token ring monitor application. If the Automatic Initial Program (IPL) is not selected, the process passes to block 92. Block 92 illustrates the continued processing by the station.

In the event an automatic Initial Program Load (IPL) is selected, the process then passes to block 94. Block 94 depicts the Initial Program Loading (IPL) of the station. This process begins, as illustrated at block 96, by the invocation of the AUTOEXEC.BAT file in a computer which is utilizing the DOS operating system. Additionally, a slight modification to the automatic execution batch file will result in the station being directed to contact the appropriate server.

The process now passes to block 98 which illustrates the downloading of updated system software from the server and thereafter, the process passes to block 100, which illustrates the termination of the server link after the updated system software has been downloaded. Finally, the process passes to block 102 which depicts the loading of updated system software into the station and the continued processing by that station. The process then terminates, as depicted in block 104.

As above, due to possible variations in hardware and software systems utilized to implement the method and system of the present invention it is not possible to set forth an exact implementation which should be utilized. However, a pseudo code listing for the remote maintenance and error correction method and system described above with respect to FIG. 4 is listed below.

```
PSEUDO CODE
MONITOR
(* All error events for this adapter are now posted
here *)
(* Network management systems such as IBM's NETVIEW can
post this adapter with the adapter event AutoRemove *)
(* Severe errors are ones that cause this workstation
```

```
PSEUDO CODE
to cause ring problems, by REBOOTING the PC TOKMON
will limit the extent of ring errors, and auto-recover
this workstation. *)
(*By detecting and acting on AutoReove events, TOKMON
can be used for ring management and auto reload and or
reconfiguration of this workstation *)
BEGIN
    DISPLAY (ErrorEvent)
    IF ErrorEvent = SevereError OR AutoRemove THEN
        REBOOT()
    ENDIF
ENDMONITOR.
```

Upon reference to the foregoing, those skilled in the art will appreciate that the method and system of the present application provides an application independent remote maintenance and error correction system which may be utilized with data processing networks to automatically reset, and/or update the system software within a station in the data processing network. Of course, those skilled in the art will appreciate that in addition to invoking the automatic execution batch file this process may be utilized to invoke any application within the station in response to an error or reconfiguration message from the network. Thus, it should be apparent that this system may be utilized to collect monitor data from a station during unattended hours, by writing an application which responds to the invocation of the token ring monitor application by downloading desired monitor information to another location within the system.

Additionally, those skilled in the art will appreciate that it is possible to associate the monitor application address with the selected user appendages while saving other user specified appendages for later use. Thus, after invoking the monitor application to reset the station within the network it will be a simple manner to access the addresses previously associated with the user appendages to invoke whatever application was selected by the user after the token ring monitor application has been invoked. In this manner, despite the fact that a user may have decided to utilize the monitor application described herein, a subsequent user may utilize the user appendages by storing desired addresses until after the monitor application has been invoked.

While the invention has been particularly shown and described with reference to a preferred embodiment, it will be understood by those skilled in the art that various changes in form and detail may be made therein without departing from the spirit and scope of the invention.

We claim:

1. A method for automatic error recovery within a network having a plurality of stations each having a network adapter, each of said plurality of stations interconnected utilizing said network adapter into a network system capable of reconfiguring said network upon the occurrence of an error condition within said network, said method comprising the steps of:

establishing a monitor application within a selected station within said network for monitoring error condition signals within said network;

associating a memory address for said monitor application with a selected user appendage provided by said network adapter;

automatically invoking said monitor application at said memory address utilizing said selected user appendage in response to detection of an error condition signal with respect to said selected station at said network adapter; and resetting said selected station in response to said invoking of said monitor application.

2. The method for automatic error recovery within a network having a plurality of stations interconnected via a network system capable of reconfiguring said network upon the occurrence of an error condition within said network according to claim 1, wherein said step of establishing a monitor application within a selected station within said network for monitoring error condition signals within said network comprises the step of establishing a terminate and stay resident monitor application within a selected station within said network for monitoring error condition signals within said network.

3. A method for automatic error recovery with a network having a plurality of stations each having a network adapter, each of said plurality of stations interconnected utilizing said network adapter into a network system capable of reconfiguring said network by adding or deleting selected stations from said network, said method comprising the steps of:

establishing a monitor application within a particular station in said network for monitoring network system commands;

associating a memory address for said monitor application with a selected user appendage provided by said network adapter;

automatically invoking said monitor application at said memory address utilizing said selected user appendage in response to detection of a reconfiguration of said network deleting said particular station from said network; and resetting said particular station and attempting to add said particular station to said network in response to said invoking of said monitor application.

4. The method for automatic error recovery within a network having a plurality of stations interconnected via a network system capable of reconfiguring said network by adding or deleting selected stations from said network according to claim 3, wherein said step of establishing a monitor application within a particular station in said network for monitoring network system commands comprises the step of establishing a terminate and stay resident monitor application within a particular station in said network for monitoring network system commands.

5. A method for automatically updating software within a particular station within a network having a plurality of stations each having a network adapter, each of said plurality of stations interconnected utilizing said network adapter into a network system capable of remotely reconfiguring said network by adding or deleting selected stations from said network, said method comprising the steps of:

establishing a monitor application within a particular station within said network for monitoring network system commands;

associating a memory address for said monitor application with a selected user appendage provided by said network adapter;

automatically invoking said monitor application at said memory address utilizing said selected user appendage in response to detection of a reconfiguration of said network deleting said particular station;

resetting said particular station in response to said invoking of said monitor application; and establishing communication between said particular station and a selected server and loading updated software from said selected server in response to said resetting of said particular station.

6. The method for automatically updating software within a particular station within a network having a plurality of stations interconnected via a network system capable of remotely reconfiguring said network by adding or deleting selected stations from said network according to claim 5, wherein step of establishing a monitor application within a particular station within said network for monitoring network system commands comprises the step of establishing a terminate and stay resident monitor application within a particular station within said network for monitoring network system commands.

7. A method for the automatic invocation of a selected application within a particular station within a network having a plurality of stations each having a network adapter, each of said plurality of stations interconnected utilizing said network adapter into a network system capable of remotely reconfiguring said network by adding or deleting selected stations from said network, said method comprising the steps of:

establishing a monitor application within a particular station within said network for monitoring network system commands;

associating a memory address for said monitor application with a selected user appendage provided by said network adapter;

automatically invoking said monitor application at said memory address utilizing said selected user appendage in response to detection of a reconfiguration of said network deleting said particular station; and automatically invoking said selected application in response to said invoking of said monitor application.

8. An automatic error recovery system for use within a network having a plurality of stations each having a network adapter, each of said plurality of stations interconnected utilizing said network adapter into a network system capable of reconfiguring said network upon the occurrence of an error condition within said network, said system comprising:

monitor means stored within a selected station within said network for monitoring error condition signals within said network;

means for associating a memory address for said monitor means with a selected user appendage provided by said network adapter;

means for automatically invoking said monitor means at said memory address utilizing said selected user appendage in response to detection of an error condition signal with respect to said selected station; and means for resetting said selected station in response to said invoking of said monitor means.

9. An automatic error recovery system for use within a network having a plurality of stations each having a network adapter, each of said plurality of stations interconnected utilizing said network adapter into a network system capable of reconfiguring said network by adding or deleting selected stations from said network, said system comprising:

monitor means stored within a particular station in said network for monitoring network system commands;

means for associating a memory address for said monitor means with a selected user appendage provided by said network adapter;

means for automatically invoking said monitor means at said memory address utilizing said selected user appendage in response to detection of a reconfiguration of said network deleting said particular station from said network;

means for resetting said particular station in response to said invoking of said monitor means; and means for attempting to add said particular station in response to said resetting.

* * * * *